Feb. 17, 1942.   W. H. JOHNSON   2,273,646
CLUTCH
Filed Nov. 15, 1939   4 Sheets-Sheet 1

INVENTOR
William Horace Johnson
BY
Albert M. Austin
ATTORNEY

Feb. 17, 1942. W. H. JOHNSON 2,273,646
CLUTCH
Filed Nov. 15, 1939 4 Sheets-Sheet 2

INVENTOR
William Hrace Johnson
BY
Albert M. Austin
ATTORNEY

Feb. 17, 1942.   W. H. JOHNSON   2,273,646
CLUTCH
Filed Nov. 15, 1939   4 Sheets-Sheet 3

INVENTOR
William Horace Johnson
BY
Albert M. Austin
ATTORNEY

Feb. 17, 1942. W. H. JOHNSON 2,273,646
CLUTCH
Filed Nov. 15, 1939 4 Sheets-Sheet 4

INVENTOR
William Horace Johnson
BY
Albert M. Gustin
ATTORNEY

Patented Feb. 17, 1942

2,273,646

UNITED STATES PATENT OFFICE 2,273,646

CLUTCH

William Horace Johnson, Cranston, R. I., assignor to Weskenson Corporation, Providence, R. I., a corporation of Rhode Island Application November 15, 1939, Serial No. 304,489

6 Claims. (Cl. 192—44)

This invention relates to machine elements and, more particularly, to controllable clutches.

According to the invention a controllable clutch is provided of the overrunning type, but provided with controllable means for changing the direction of overrunning action, for disconnecting entirely the driving and driven elements, and for positively locking the driving and driven elements for driving operation in either direction. This device preferably incorporates the so-called "three-roll" clutch although the construction is not necessarily so limited. To reduce friction when the main gripping rolls are released, special auxiliary contact rollers may be provided for positioning the main rolls to obtain the desired controlling action.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a side elevation of the clutch;

Figure 2:
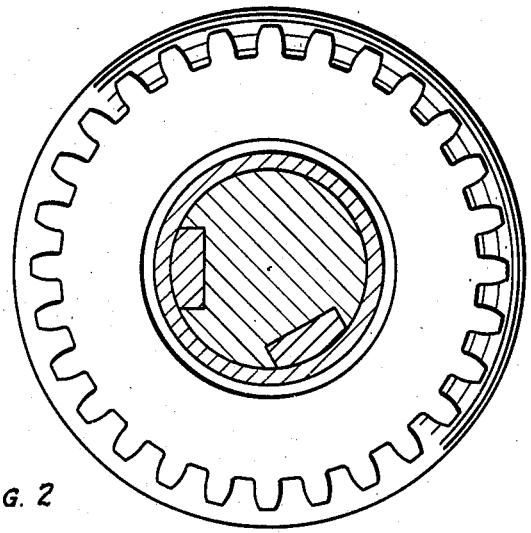
Fig. 2 is an end view taken on the line 2—2 of Fig. 1.
Figure 1:
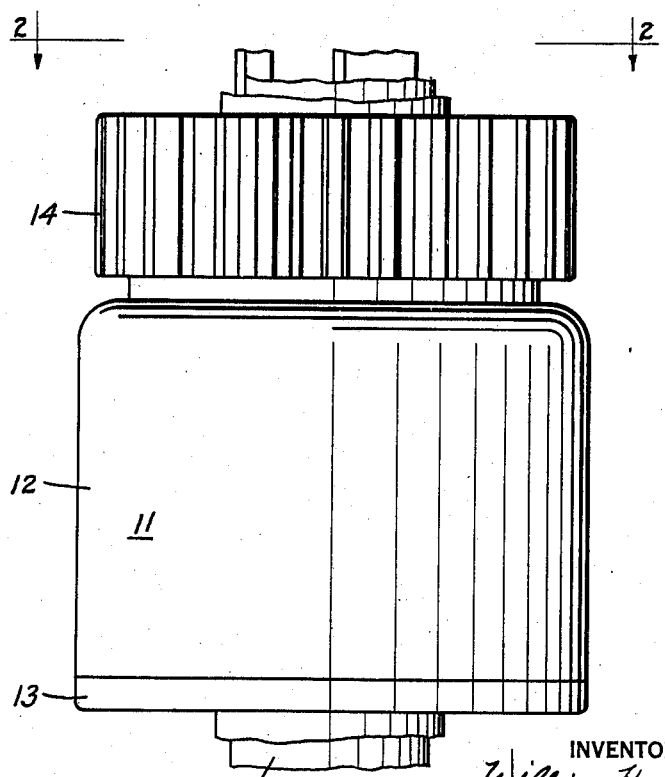
Figure 5:
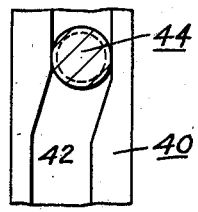
Figure 6:
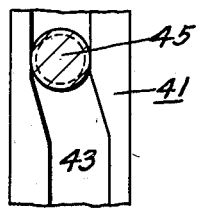
Figure 3:
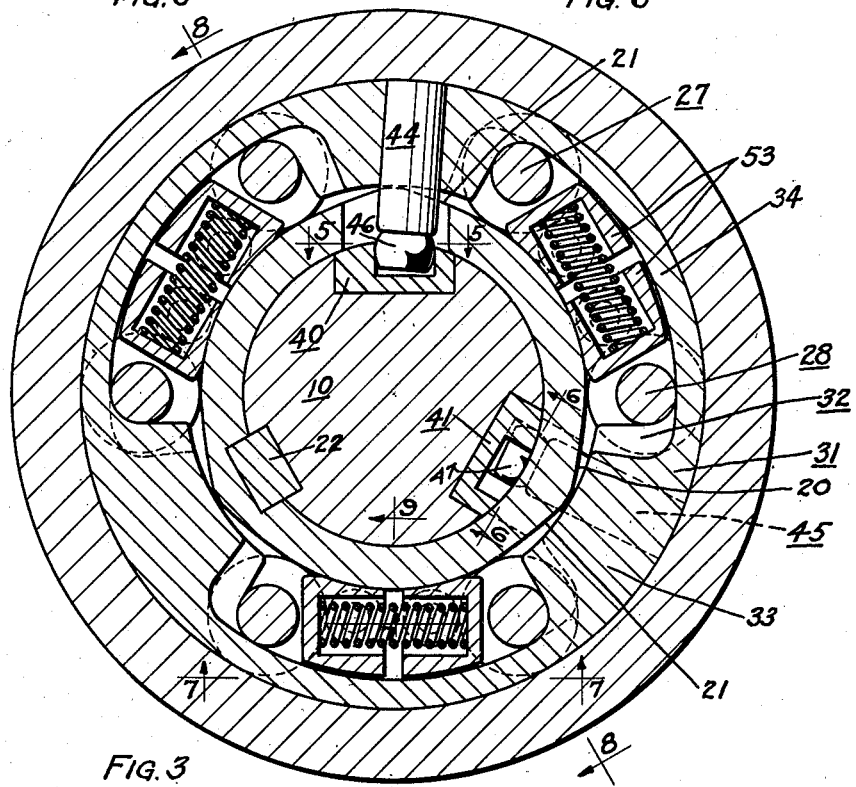
Fig. 3 is a radial section taken on the line 3—3 of Fig. 8, showing the rolls in completely released position.
Figure 7:
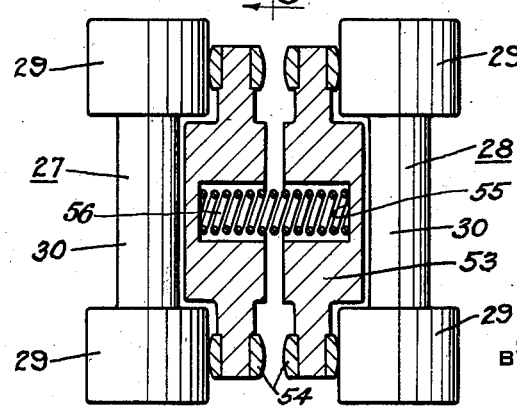
Figure 4:
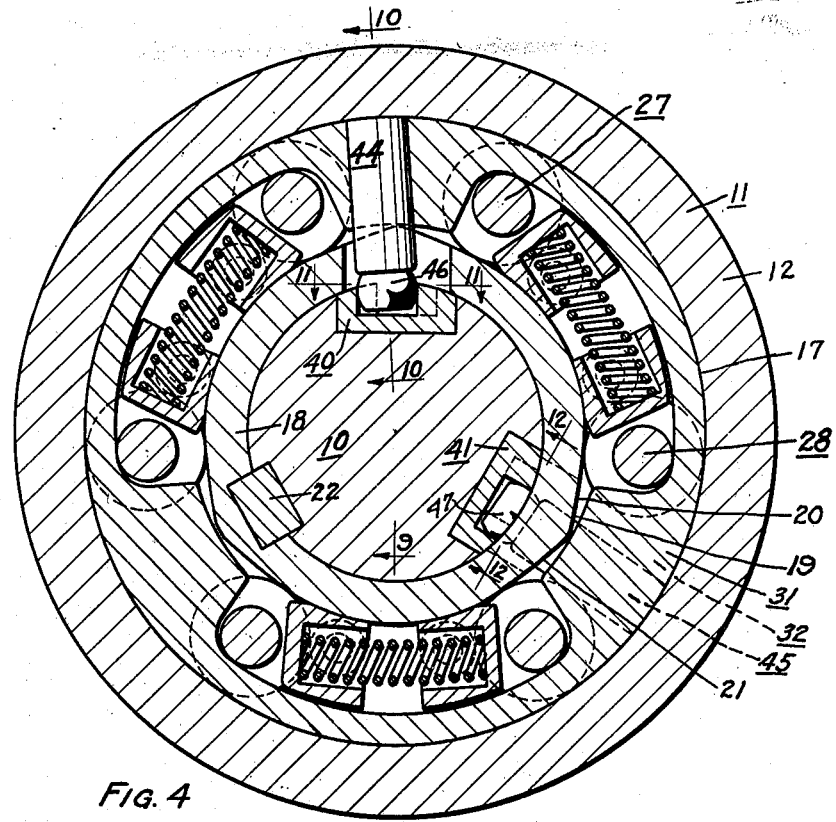
Fig. 4 is a section similar to Fig. 3 but showing the rolls in position for gripping the driving and driven elements in both directions of rotation.
Figure 9:
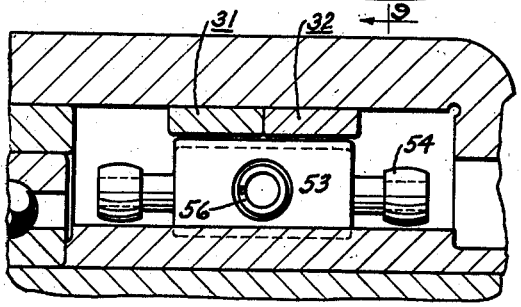
Figure 11:
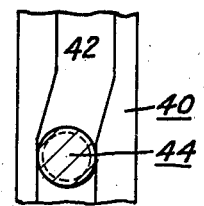
Figure 10:
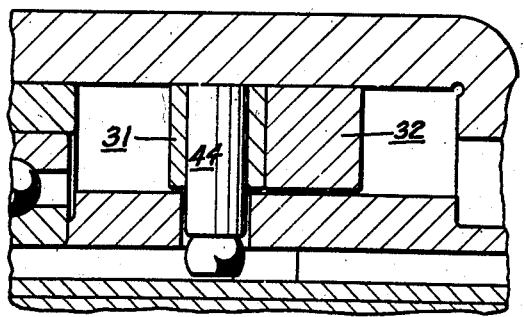
Figure 12:
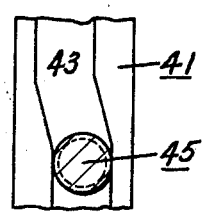
Figure 8:
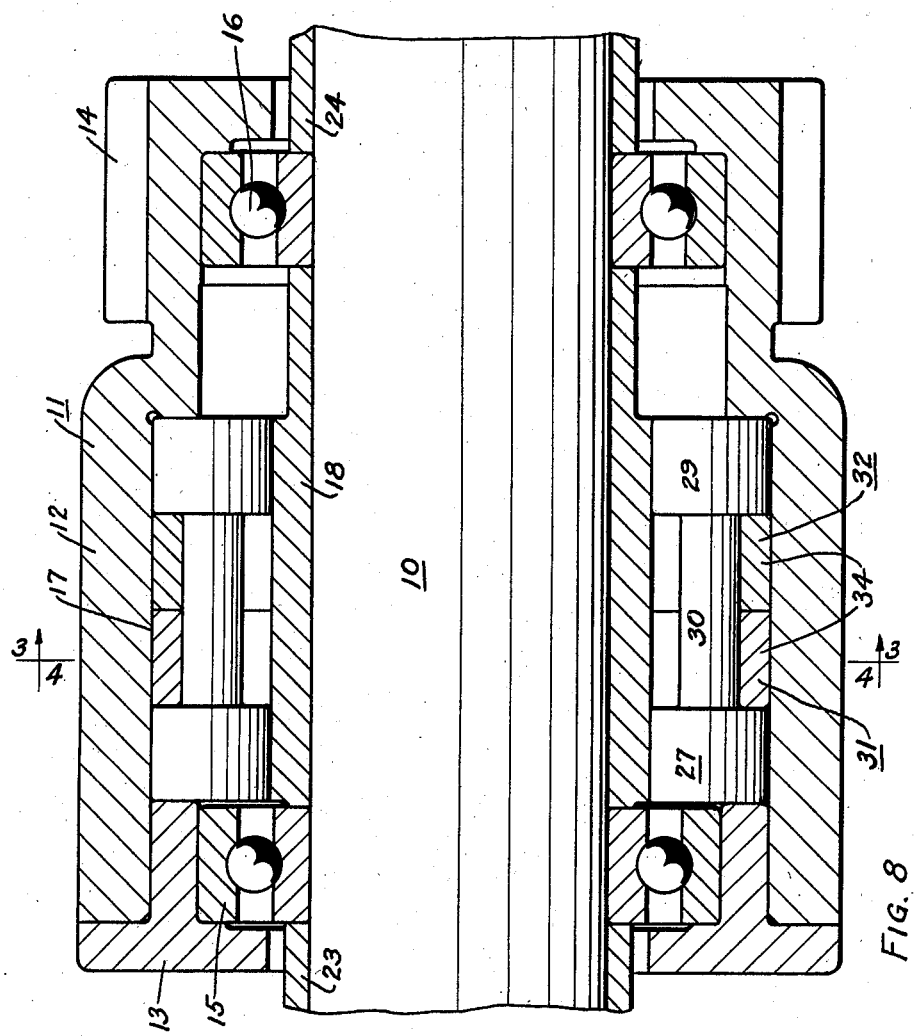

Figs. 5 and 6 are fragmentary sections taken on the lines 5—5 and 6—6 of Fig. 3;

Fig. 7 is a section taken on the line 7—7 of Fig. 3, illustrating the spring assemblies for controlling the main rolls;

Fig. 8 is a longitudinal section taken on the line 8—8 of Fig. 3;

Figs. 9 and 10 are fragmentary sections taken on the lines 9—9 and 10—10 of Fig. 4; and Figs. 11 and 12 are fragmentary sections taken on the lines 11—11 and 12—12 of Fig. 4.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, the shaft 10 is supported for rotation in suitable bearings (not shown). Surrounding shaft 10 is a cage 11 made up of a body 12 and a detachable cap 13. Formed on body 12 is a spur gear 14 having driving relation with another gear (not shown).

Ball bearing assemblies 15 and 16 journal cage 11 upon shaft 10. The outer races of these assemblies are set in bores in the cap 13 and body 12. The inner races of bearing assemblies 15 and 16 are supported by the shaft 10 and are axially fixed in any suitable way as by members 23 and 24 fixed to shaft 10. Located between the inner races of bearing assemblies 15 and 16 is a ring or sleeve 18.

The inner surface of cage body 12 is formed to provide a cylindrical rollway 17. The outer surface of ring 18 forms a cooperating rollway having three raised portions 19, each of which has tapered surfaces 20 and 21. Ring 18 is suitably keyed to shaft 10 by key 22.

Disposed in the rollways are three pairs of double rolls 27, 28. These rolls are identical in construction, each comprising enlarged cylindrical ends or drums 29 connected by a reduced mid-portion 30.

For controlling the positions of double rolls 27 and 28 with respect to the tapered portions 20, 21, two similar control rings 31 and 32 are provided. Each control ring has three enlargements or abutments 33 and reduced connecting portions 34. The two connecting portions 34 are fitted side by side within the reduced mid-portions 30 of the double rolls, as indicated particularly in Fig. 8.

For rotatably shifting the control rings 31, 32 sliding keys 40, 41 are provided, these keys being set in shaft 10. These keys may project beyond the cage 11 and may be shifted independently axially by any suitable means (not shown). Keys 40 and 41 have cam ways 42, 43 in which work pins 44, 45 having rounded heads 46, 47. Pin 44 is connected to control ring 31 and pin 45 is connected to control ring 32.

For holding the main rolls 27 and 28 against the abutments 33 of the control rings 31, 32, a series of spring assemblies are provided. Each spring assembly (Fig. 7) comprises a pair of shoes 53 having spaced rollers 54 journalled thereon. The rollers 54 may be crowned or curved axially. Shoes 53 have seats 55 in which are disposed helical springs 56. The rollers 54 may be crowned or curved axially. The cooperation between rolls 28 and tapered surfaces 20 and 21 depend upon the relative positions of these parts, which in turn are controlled by the positions of sliding keys 40 and 41.

The clutch has four main conditions of operation:

(1) When the keys 40 and 41 are at the positions shown in Figs. 5 and 6, all sets of rolls 27 and 28 take the position shown in Fig. 3 where the control rings 31, 32 engaging the reduced mid-portions 30 have moved the rolls 27, 28 together, compressing springs 56 so that the rolls are free of tapered surfaces 20 and 21 and the cage 11 and shaft 10 may rotate in either direction relative to the other. This position may be called "neutral" since no power can be transmitted from either shaft to cage or cage to shaft in either direction.

(2) When the keys 40 and 41 are moved to the positions shown in Figs. 11 and 12, the parts of the clutch take the position shown in Fig. 4. Here the abutments 33 of control rings 31 and 32 are in complete register and completely release all sets of rolls 27 and 28, the springs 56 forcing both rolls into operative engagement with their tapered surfaces 20 and 21. This may be called the "locked" position of the clutch since power may be transmitted from shaft 10 to cage 11 or from cage 11 to shaft 10 in either direction of rotation without any lost motion.

(3) If key 40 is shifted to the position shown in Fig. 5 and key 41 to the position shown in Fig. 12, control ring 31 takes the position shown in Fig. 3 while control ring 32 takes the position shown in Fig. 4. Control ring 31 keeps rolls 27 out of operative engagement with tapered surfaces 21 while control ring 32 permits rolls 28 to engage tapered surfaces 20. This provides overrunning clutch action so that clockwise rotation of the cage 11 in Figs. 3 and 4 will drive shaft 10 or counter-clockwise rotation of shaft 10 in these figures will drive cage 11, the parts overrunning in each case.

(4) If key 40 is shifted to the position shown in Fig. 6 and key 41 shifted to the position shown in Fig. 11, rolls 27 are moved to operative position with respect to tapered surfaces 21 while rolls 28 maintain their inoperative positions. This provides an overrunning action similar to condition #3 but in the opposite direction.

Thus a controllable clutch is provided which is susceptible of a variety of operations by merely shifting simple key members. A reciprocating movement applied to either the shaft or the cage may be converted into a unidirectional movement and the direction of unidirectional movement may be changed simply and easily. The shaft and cage may be locked together or they may be entirely disconnected. It is obvious that this device may be used in any transmission where such controllable movement is necessary or desirable. A plurality of such devices may be used through which different reciprocating motions may be applied to the same driven element to give uniform rotation in the same direction.

While certain novel features of the invention have been disclosed and are pointed out in the annexed claims, it will be understood that various omissions, substitutions and changes may be made by those skilled in the art without departing from the spirit of the invention.

What is claimed is:

1. In a clutch, first and second power transmitting members having annular rollways, one of said rollways having raised portions, each raised portion having opposite tapered surfaces, pairs of rolls disposed between said rollways and between said raised portions, a plurality of control rings each having internal abutments providing recesses for said rolls, spring assemblies, one for each recess, each spring urging its pair of rolls apart against the adjacent abutments of said rings, and means for shifting said control rings to move said rolls into and out of operative engagement with said tapered surfaces.

2. In a clutch, a supporting shaft, a cage journalled on said shaft and having an annular internal channel providing a rollway, a ring having a plurality of externally raised portions providing a rollway, each raised portion having oppositely inclined surfaces, pairs of cylindrical rolls disposed between said rollways and between said raised portions, a pair of control rings, each having internal abutments providing sets of recesses therebetween, a pair of said rolls being disposed in each set of recesses, and springs disposed between each pair of rolls.

3. In a clutch, a supporting shaft, a cage journalled on said shaft and having an annular internal channel providing a rollway, a ring having a plurality of externally raised portions providing a rollway, each raised portion having oppositely inclined surfaces, pairs of cylindrical rolls disposed between said rollways and between said raised portions, a pair of control rings, each having internal abutments providing sets of recesses therebetween, a pair of said rolls being disposed in each set of recesses, spring assemblies, one disposed between each pair of rolls, each spring assembly comprising a pair of shoes having contact rollers bearing against its pair of rolls and a spring between said shoes, and means for shifting said control rings.

4. In a clutch, a supporting shaft, a cage journalled on said shaft and having an annular internal channel providing a rollway, a ring having a plurality of externally raised portions providing a rollway, each raised portion having oppositely inclined surfaces, pairs of cylindrical double rolls disposed between said rollways and between said raised portions, each double roll comprising enlarged end portions and a reduced mid-portion, a pair of control rings, each having internal abutments and reduced connecting portions, said connecting portions being disposed side by side between said enlarged ends, said abutments providing sets of recesses therebetween, a pair of said double rolls being disposed in each set of recesses, spring assemblies, one disposed between each pair of double rolls, each spring assembly comprising a pair of shoes having contact rollers bearing against the enlarged ends of said pair of double rolls and a spring between said shoes, and means for shifting said control rings.

5. In a clutch, a supporting shaft, a cage journalled on said shaft and having an annular internal channel providing a rollway, a ring having three, equally spaced, externally raised portions providing a rollway, each raised portion having oppositely inclined surfaces, three pairs of equally spaced cylindrical double rolls disposed between said rollways and between said raised portions, each double roll comprising enlarged end portions and a reduced mid-portion, a pair of control rings, each having internal abutments and reduced connecting portions, said connecting portions being disposed side by side between said enlarged ends, said abutments providing sets of recesses therebetween, a pair of said double rolls being disposed in each set of recesses, spring assemblies, one disposed between each pair of double rolls, each spring assembly comprising a pair of shoes having contact rollers bearing against the enlarged ends of its pair of double rolls and a spring between said shoes, axial slidable keys in said shaft, said keys having camways, pins in said camways secured respectively to said control rings.

6. In a clutch, first and second clutch elements, one of which has a rollway and the other of which has a plurality of wedging surfaces, a plurality of double rolls, each double roll comprising enlarged drum-shaped ends and a reduced connecting portion, said double rolls cooperating with said rollway and said wedging surfaces to obtain overrunning clutch action, a plurality of control rings surrounding and riding in the reduced connecting portions of said double rolls, means for rotating said control rings with respect to each other and to said wedging surfaces to change the relation therebetween.

WILLIAM HORACE JOHNSON.